(12) United States Patent
Heinemann et al.

(10) Patent No.: US 9,616,522 B2
(45) Date of Patent: Apr. 11, 2017

(54) DEVICE AND METHOD FOR LASER MATERIAL MACHINING

(71) Applicant: DirectPhotonics Industries GmbH, Berlin (DE)

(72) Inventors: Stefan Heinemann, Ann Arbor, MI (US); Haro Fritsche, Berlin (DE); Bastian Kruschke, Berlin (DE); Wolfgang Gries, Berlin (DE); Fabio Ferrario, Berlin (DE); Ralf Koch, Lindingoe (SE)

(73) Assignee: DIRECTPHOTONICS INDUSTRIES GMBH, Berlin (DE)

( * ) Notice: Subject to any disclaimer, the term of this patent is extended or adjusted under 35 U.S.C. 154(b) by 148 days.

(21) Appl. No.: 14/648,046

(22) PCT Filed: Nov. 29, 2013

(86) PCT No.: PCT/EP2013/075101
§ 371 (c)(1),
(2) Date: May 28, 2015

(87) PCT Pub. No.: WO2014/083160
PCT Pub. Date: Jun. 5, 2014

(65) Prior Publication Data
US 2015/0321286 A1  Nov. 12, 2015

(30) Foreign Application Priority Data

Nov. 30, 2012  (DE) .......................... 10 2012 023 376

(51) Int. Cl.
*B23K 26/06* (2014.01)
*B23K 26/34* (2014.01)
(Continued)

(52) U.S. Cl.
CPC ...... *B23K 26/0604* (2013.01); *B23K 26/0608* (2013.01); *B23K 26/0613* (2013.01);
(Continued)

(58) Field of Classification Search
CPC  B23K 26/06; B23K 26/0604; B23K 26/0643; B23K 26/34
(Continued)

(56) References Cited

U.S. PATENT DOCUMENTS 6,838,639 B2 * 1/2005 Kreuter .............. B23K 26/0613
                                                     219/121.76
7,265,314 B2 * 9/2007 Debeze .............. B23K 26/0613
                                                     219/121.63

FOREIGN PATENT DOCUMENTS

DE       19933825 A1    2/2000
WO    WO 01/60560 A1    8/2001
WO  WO 2007/140537 A1  12/2007

OTHER PUBLICATIONS

International Search Report mailed on Jul. 17, 2014 in PCT/EP2013/075101.

* cited by examiner

*Primary Examiner* — Samuel M Heinrich
(74) *Attorney, Agent, or Firm* — Fox Rothschild LLP

(57) ABSTRACT

The invention discloses a device for laser material machining, with at least two laser beam sources (*2a-2c*) which emit laser beams (*5a-5c*) of different wavelengths, with associated beam imaging means (*3a-3c*), to configure appropriately the beam paths of each associated laser beam (*5a-5c*), a beam superposition device (*6*), to overlay the laser beams (*5a-5c*) on each other, and imaging optics (*8*), to image the overlaid laser beams (*5a-5c*) onto a workpiece (*12*) so that respective focal points are associated with the laser beams (*5a-5c*) in the focus of the imaging optics (*8*) on the (Continued)

Figure 1:
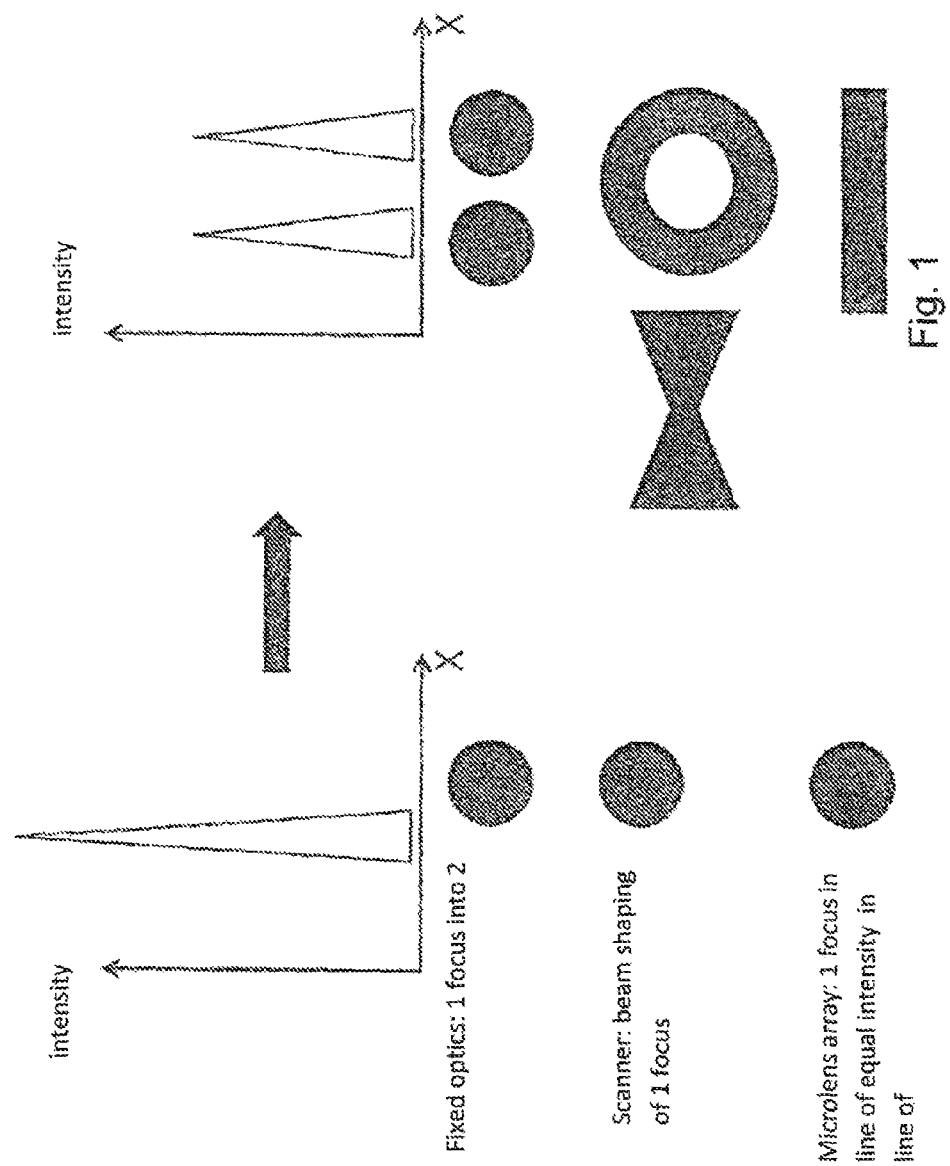

workpiece (12), wherein the beam imaging means image the laser beams (5a-5c) onto the respective focal points in a predefined arrangement which can be varied by means of the beam imaging means (3a-3c). According to the invention, electronic control devices (4a-4c) are provided which are able to vary each of the outputs of the laser beams (5a-5c) with a high frequency to vary the intensities of the respective focal points at the focus of the imaging optics (8) in a predefined manner. In this way, a high frequency control of the parameters of laser material machining which can be combined with conventional modulation techniques is implemented.

17 Claims, 12 Drawing Sheets

(51) Int. Cl.
*B23K 26/073* (2006.01)
*B23K 26/0622* (2014.01)

(52) U.S. Cl.
CPC ...... *B23K 26/0622* (2015.10); *B23K 26/0643* (2013.01); *B23K 26/073* (2013.01); *B23K 26/34* (2013.01)

(58) Field of Classification Search
USPC ............ 219/121.61–121.72, 121.74, 121.76, 219/121.83
See application file for complete search history.

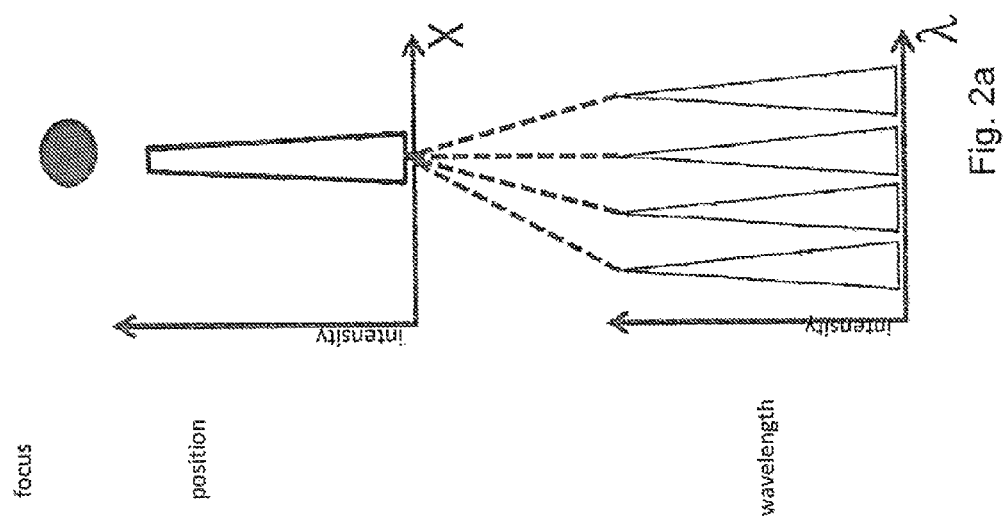

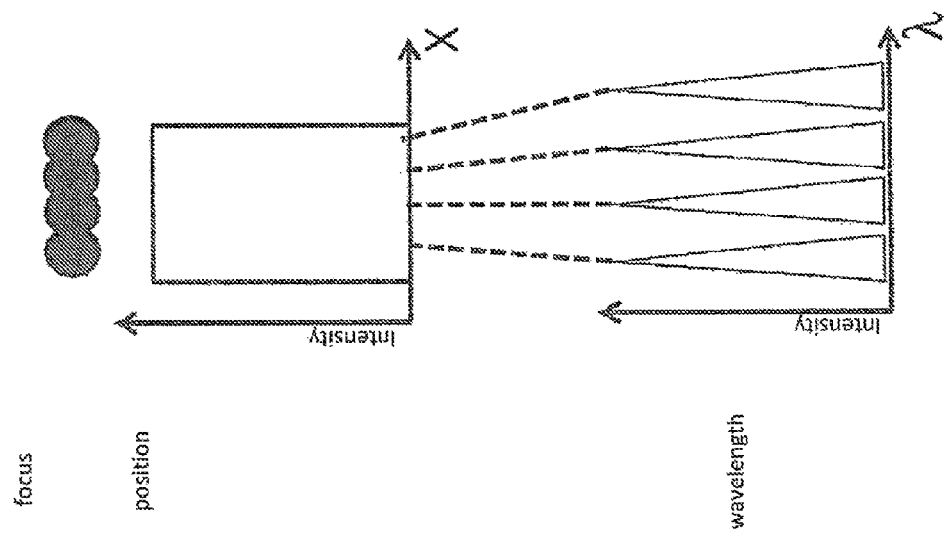

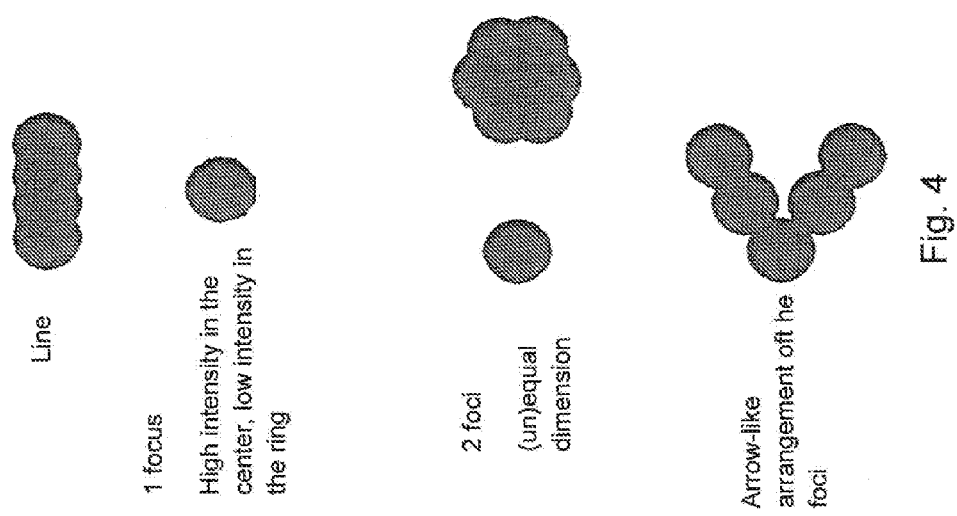

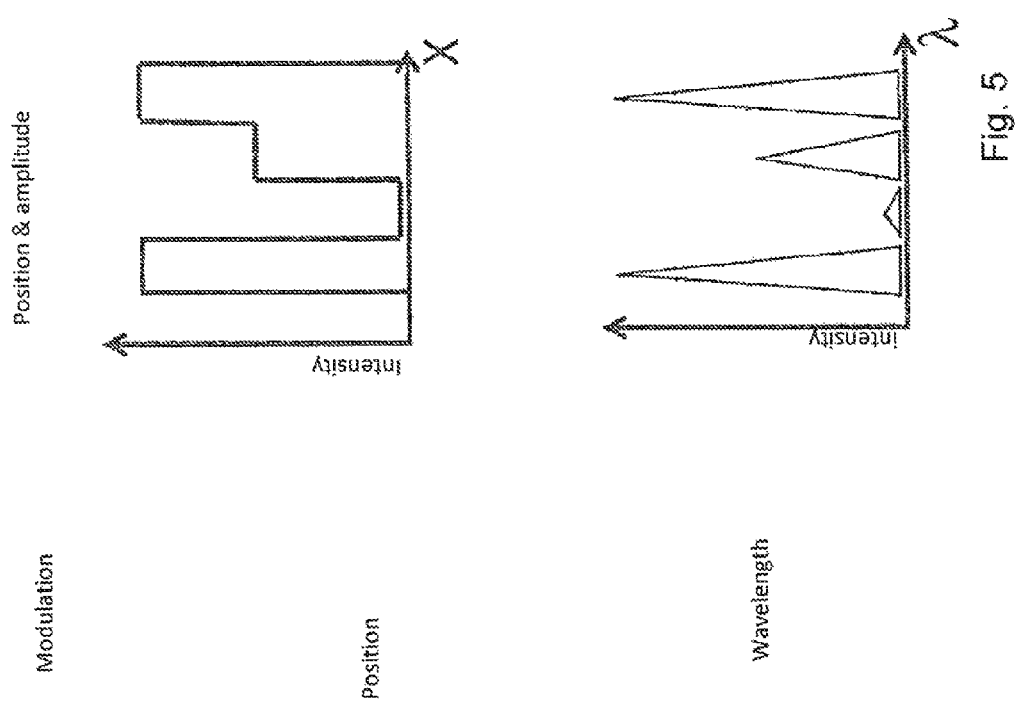

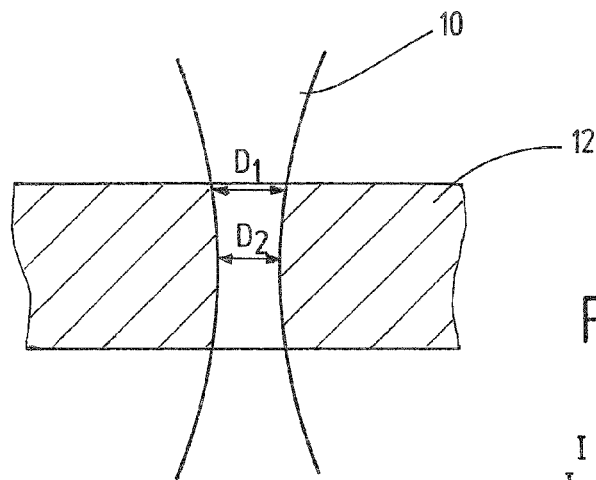
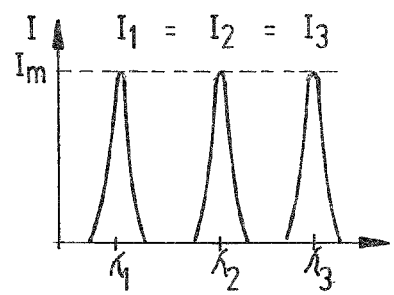
Fig.6a
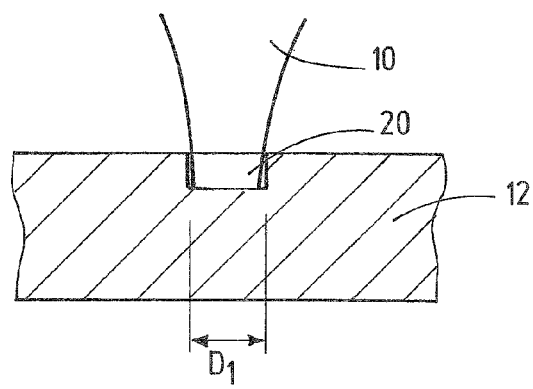
Fig.6b
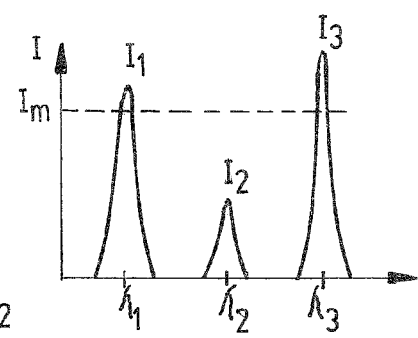
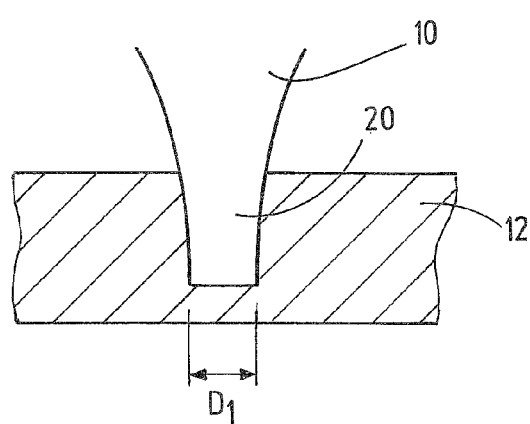
Fig.6c

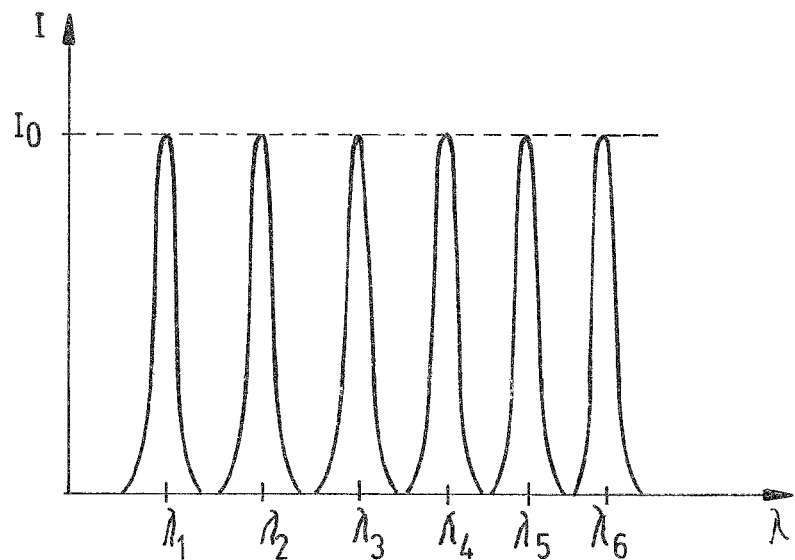
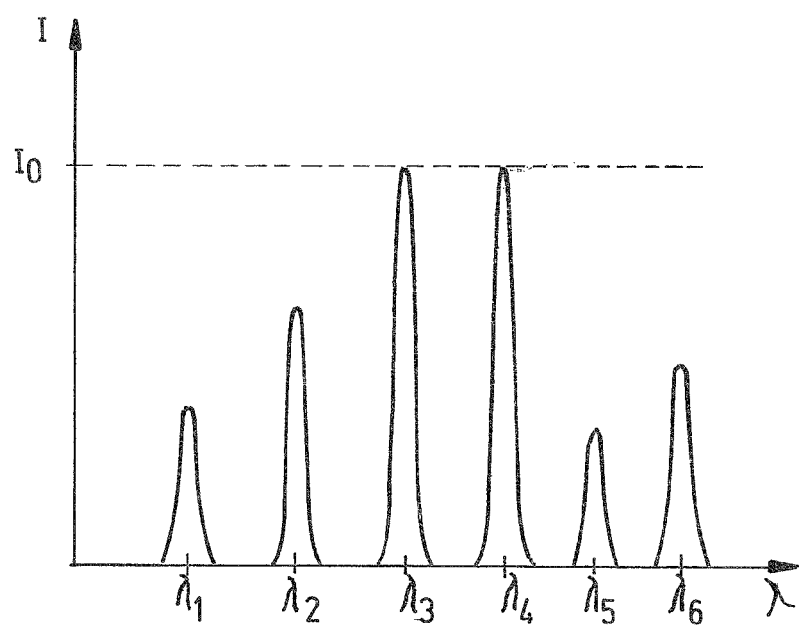
Fig.7a

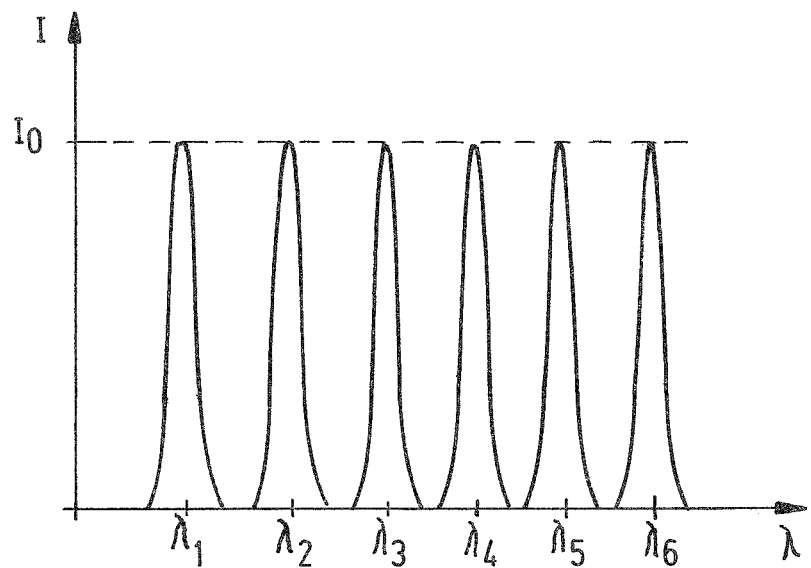
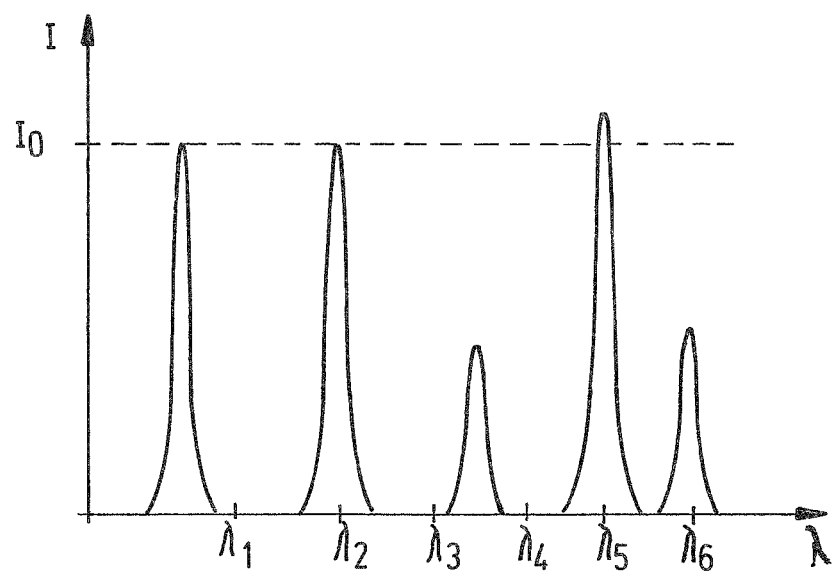
Fig.7b

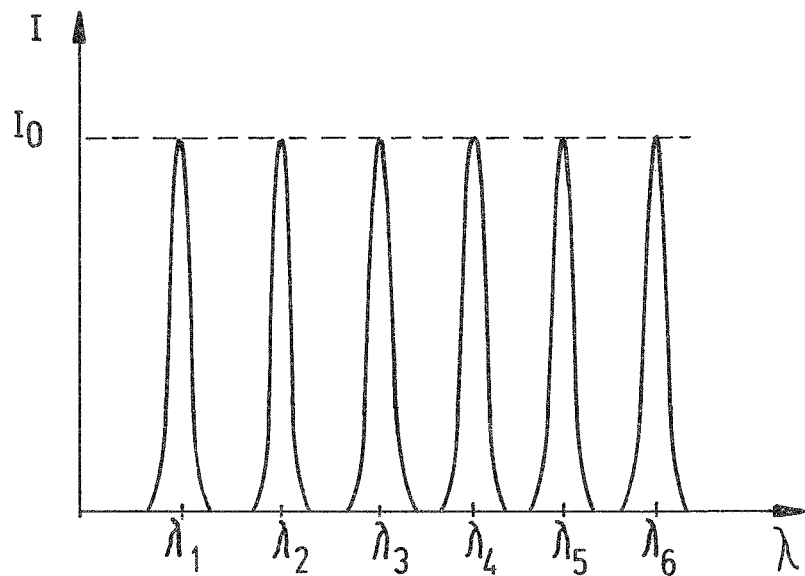
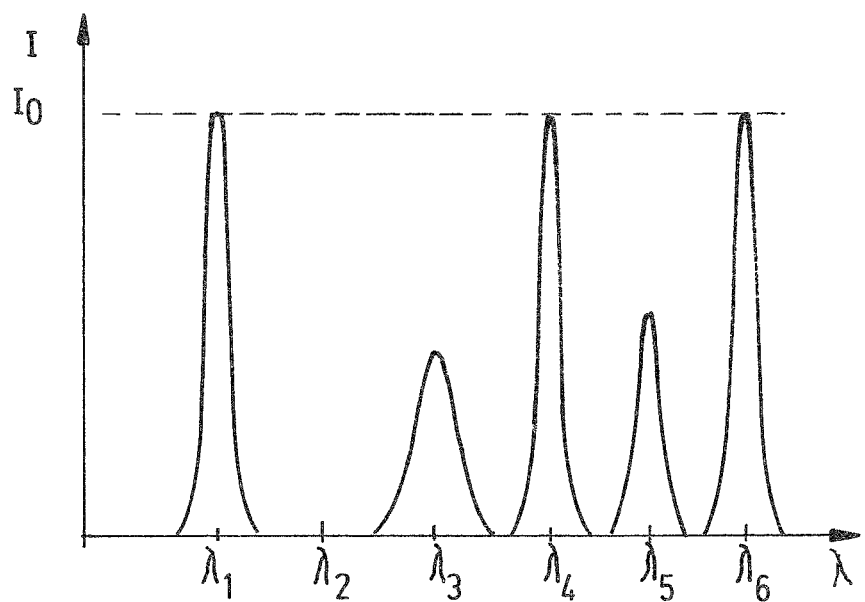
Fig.7c

DEVICE AND METHOD FOR LASER MATERIAL MACHINING

CROSS-REFERENCE TO RELATED APPLICATIONS

This application is a §371 U.S. National Stage Entry of International Application No. PCT/EP2013/075101 filed Nov. 29, 2013, which claims priority to and the benefit of German Application No. 10 2012 023 376.0, filed Nov. 30, 2012, the entirety of both are hereby incorporated herein by reference.

FIELD OF THE INVENTION

The invention relates to a device and a method for laser material machining.

BACKGROUND OF THE INVENTION

Efficient laser material machining is based on the optimization of the interaction of laser light with matter for a plurality of different processes.

For example, it is known that, when thin metal sheets are cut, a small focus having a small depth of focus allows higher cutting speeds and cutting quality than a large focus. In case of thicker sheets having thicknesses of more than about 6 mm, a larger focus is required for efficient cutting. A wider kerf has to be generated to be able to efficiently expel the liquefied material, whereas a narrow kerf is sufficient with thin sheets. In order to be able to quickly adjust the focus to different requirements, special cutting optics have been developed which allow the mechanical displacement of lenses. Further, it is known that different materials have a different interaction with the laser and thus an adjustment of the focus to the material is required, too.

In laser welding, it is also known that the geometry of the focus has a large influence on the geometry and quality of the welding seam. For example, in fast welding of typically more than 15 m/min, humping is observed. In this case, the welding bead forms major irregularities. An elongated beam increases the maximum welding speed by up to the factor two or more. Typically, welding optics are used that generate two foci which can be adjusted with respect to their position to one another and their respective intensity.

Further, the focus geometry has to be matched with the thickness of the sheets to be welded and the existent geometry of the joining edges. This is obvious for the butt joint. When both joining edges have a rectangular geometry, this results in a minimum joining gap, and a small focus achieves fast welding speeds and better quality. But if the joining gaps are poorly prepared, the result is a large gap, and a broad focus has to be used. For the lap weld, it is known that a large depth of focus and a small focus exhibit a high gap bridging ability whereas large foci and a small depth of focus can only bridge small gap widths. In the case of known edge quality and geometry special optical systems are used, respectively. Gap bridging is achieved, for example, by hybrid optics which combines MIG welding (metal inert gas welding) and laser welding or introduces wire as additional material into the laser beam. Scanners are used, too, which rapidly oscillate the laser beam and thus melt additional material which serves for bridging gaps.

Different material thicknesses in the butt joint require a dedicated beam shaping in order to make the heat input into the joining zone symmetrical, to prevent an overheating of the thin sheet, and to heat the thick sheet correspondingly. Here, double beam optics is often used, as described above.

Due to intermetallic phases, the welding of different materials poses a challenge, too. Here, the specific heat input and the temperature distribution developing between the join partners are crucial for the welding quality. For example, when aluminum and copper are joined, most of the beam intensity is applied on the copper in order to compensate for its thermal conductivity and its higher melting point.

Another example for beam shaping can be found in joining zones of different widths, for example, in the lap weld of plastics. Fine geometries and flat connections are found in many components. The absolute heat input and the line energy have to be exactly controlled to prevent burning of the plastic at the edge. Here, an exposure by masks or scanners is often used which generate a focus line adapted to the seam geometry.

Welding of galvanized sheets poses a challenge because the zinc evaporates in the intermediate layer during laser welding and outgasses through the melt, wherein big and irregular bubbles occur in the welding seam, which negatively influence the stability. It has been shown that special and complex focus geometries can largely prevent outgassing. Here too, double beam optics is used, but often more complex focus geometries are required.

In the field of build-up welding, a plurality of different focus geometries are used. Filigree structures with high surface finish require small spots and performance whereas large surfaces typically are coated with large round or line foci. Here, mostly fixed optics with dedicated focus is used.

Similarly, this is the case for laser hardening where the focus and the power have to be dynamically adapted to the component to prevent melting of the skin layer. Special fixed optics as well as scanners are used here to select the focus correspondingly or to adapt it to the tool geometry.

Ablating processes and drilling also benefit from a dynamic variation of the focus and the power. For example, different structures or any hole geometries can be easily ablated correspondingly. Mostly, a scanner is used for this purpose.

In addition to the required flexibility in spot geometry and power of single processes of the laser material machining, the execution of several processes with an optics is desirable in order to optimize the utilization of the system. However, the requirements on the focus geometry and intensity are even more diverse than in the case of single processes, and thus this is not possible with today's optics.

Commercial optical systems are very limited in their flexibility to vary the focus geometry. Twin spot optics with a variable distance of two foci and their intensity, microlens arrays for homogenizing the intensity mainly in conjunction with the generation of line foci and diffractive optical elements for generating a determined arbitrary pattern in connection with low performance (FIG. 1) are known. All these optics have in common that they generate a determined focus geometry and only—if at all—allow a small flexibility of the focus geometry. Thus, an adaptation to the varying requirements of the processes is only possible with an enormous amount of time and money.

Scanners direct a laser beam over two movable mirrors and subsequently focus it with a f-theta lens. By means of this arrangement, a focused laser beam can be moved over the work piece at 10 m/s and faster. Specific geometries are programmed. Hereby, different focus geometries can be adjusted in a very flexible manner. However, the fast control between the laser and the scanner poses a technical challenge. So, it is only limitedly possible to dynamically adapt the power to the process. For a good spatial resolution, regulation times of a few microseconds are required, but they typically amount to tens to hundreds of microseconds. But during this time the focus may be already moved a few tens of millimeters over the work piece.

Further, a scanner is a complex and expensive optical unit and also far away from the work piece, and thus the introduction of additional materials represents a considerable additional effort.

SUMMARY OF THE INVENTION

The object of the present invention is to provide an optical arrangement which does not have the above-described drawbacks or at least attenuates them. Particularly, an improved device for laser material machining and a corresponding method are to be provided by which the parameters and conditions in laser material machining can be adjusted more precisely.

This and further objects are solved according to the invention by a device for laser material machining according to claim 1 and by a corresponding method for laser material machining according to claim 16. Further advantageous embodiments are subject of the related sub-claims.

According to the invention, any focus geometries can be realized in a simple way which can realize any intensity distributions at the work piece in combination with a fast electronic control or regulation. This allows for the optimization of specific laser machining processes, as for example cutting and welding, with respect to the quality and productivity over a wide range of materials, material thicknesses and joining gap geometries. Further, this allows to perform different processes with an optics and thus to further increase the productivity in laser material machining.

According to an aspect of the present invention, a device for laser material machining is disclosed, comprising: at last two laser beam sources which emit laser beams of different wavelengths, beam imaging means respectively associated with the laser beam sources and configured to appropriately adjust the beam paths of the respective laser beams, a beam superposition device configured to overlay the laser beams on each other, an imaging optics configured to image the overlaid laser beams in such a way that respective focal points are associated with the laser beams in the focus of the imaging optics, wherein the beam imaging means image the laser beams onto the respective focal points in a predetermined arrangement that can be varied by means of the beam imaging means, and electronic control devices designed to vary the powers of the respective laser beams in a different manner, so that the intensities of the respective focal points are varied in a predetermined manner in the focus of the imaging optics.

Preferably, the laser beam sources are formed as diode lasers. Preferably, the laser beam sources (central wavelength) emit in the wavelength range of 200 to 2000 nm, more preferably in the wavelength range of 800 to 1100 nm and 1400 to 1900 nm. Preferably, the laser beam sources comprise a line width of less than 20 nm, more preferably of less than 10 nm, even more preferably of less than 5 nm, still more preferably of less than 2 nm and most preferably of less than 1 nm. Preferably, the wavelength ranges of the laser beam sources are disjoint to each other, i.e. do not overlap. The maximum power of the individual laser beam sources is preferably between 10 W and 10 kW, more preferably between 50 W and 1 kW. Preferably, the ratio of the maximum power to minimum power of the plurality of the laser beam sources is between 1 and 5, more preferably between 1 and 2 and even more preferably between 1 and 1.2. Preferably, the ratio of the maximum line width (in which 90% of the radiation energy are included) to the minimum line width (in which 90% of the radiation energy are included) of the plurality of the laser beam sources is between 1 and 5, more preferably between 1 and 2 and even more preferably between 1 and 1.2.

Preferably, the beam imaging means and the beam superposition device are integrally formed. Preferably, the beam imaging means and/or the beam superposition device are formed by (first) deflection mirrors. The integrated device of beam imaging means/beam superposition device preferably comprises a number (or a number of the laser beam sources minus one) of (first) deflection mirrors corresponding to the number of the laser beam sources. These (first) deflection mirrors are preferably arranged along a common optical axis. Preferably, at least one of the (first) deflection mirrors is rotatably arranged, more preferably, all of these (first) deflection mirrors are rotatably arranged, wherein the rotation axes of the deflection mirrors preferably are arranged along a common optical axis. A (first) deflection mirror nearest to the imaging optics is preferably configured to reflect laser radiation of an associated laser beam source and to let pass the laser radiation of all the other laser beam sources in a transmissive manner. Here, it is preferred that the reflection with respect to the laser radiation of the associated laser beam source is greater than 0.7 (preferably 0.8 and more preferably 0.9) and the transmission with respect to the other laser beam sources is greater than 0.7 (preferably 0.8 and more preferably 0.8). A deflection mirror which in turn is nearest to this deflection mirror (along the common optical axis) is preferably configured to reflect laser radiation of an associated laser beam source and to let pass laser radiation of the remaining other laser beam sources in a transmissive manner, and so on. Preferably, all laser beam sources are oriented parallel to each other (with respect to their emission direction), wherein a further (second) respectively reflective deflection mirror is associated with a plurality of laser beam sources (preferably, with each laser beam source or each laser beam source minus one) which is arranged in such a way that it deflects the radiation of the associated laser beam source onto the first deflection mirror from which the radiation of the associated laser beam source is reflected to the imaging optics. In a preferred embodiment variant of the invention, at least one of the first deflection mirrors is tilted in such a way that the focal point corresponding to the associated laser beam is outside the common optical axis and/or outside the rotation axis of the imaging optics. The imaging optics is preferably formed by a rotationally-symmetrical optical system. The rotation axis of the imaging optics is preferably identical to the common optical axis of the first deflection mirrors. Preferably, the deflection mirrors are arranged in such a way that the focal point of at least one of the associated laser beams is on the rotation axis of the imaging optics, wherein the focal point of at least another associated laser beam is outside the rotation axis of the imaging optics. Due to the different rotation (or tilt) of the first/second deflection mirrors the respective focal points are variable and can be adjusted according to a predetermined arrangement.

According to a preferred alternative embodiment variant, it is possible to utilize a different orientation of the polarization of the respective lasers by means of a selected tilting of polarization-selective elements. The powers of the individual partial beams can be simply regulated electronically, wherein, for example, Pockets cells (and polarizers) can be used as attenuators. Therefore, the first/second deflection mirrors are preferably configured as (tiltable) polarization-selective elements and/or corresponding polarization-selective elements are arranged in the beam path. Here, it is preferred that the degree of the dependence of the reflection/transmission from the polarization may be regulated electronically.

The electronic control devices are designed, according to the invention, to vary the powers of the respective laser beams in a different manner, so that the intensities of the respective focal points are varied in a predetermined manner in the focus of the imaging optics. This means that the powers of the respective laser beams can take different values (and ratios different from each other) at different instants of time. Thus, the geometry and the energy distribution of the common focus (for material machining) can be already varied in a fast and flexible manner by an electronic power control without necessarily having to use mechanically movable parts. According to the invention, the variation of the geometry/energy distribution of the common focus both can be executed by the electronic power control and by rotating (or tilting) the first/second deflection mirrors. But it is also possible to realize variation of the geometry/energy distribution of the common focus both either by the electronic power control or by rotating (or tilting) the first/second deflection mirrors, respectively.

Preferably, the electronic control devices are designed to generate a continuous laser operation with varying powers of the respective laser beams, and thus the intensities of the respective focal points are varied in a predetermined manner in the focus of the imaging optics. In other words, a continuous laser operation shall be realized during material machining, wherein the geometry/energy distribution of the common focus (of all laser beams) is varied in time.

Preferably, the beam imaging means adjust the beam paths of the respectively associated laser beams in such a way that they are (substantially) collinear, wherein the laser beams are respectively collinear. Preferably, the electronic control devices vary the powers of the respective laser beams by controlling the respectively associated laser beam sources. Alternatively or additionally, it is provided that the electronic control devices vary the transmission of respective electronically controllable attenuators that are arranged downstream of the associated laser beam sources, respectively, in order to vary the powers of the respective laser beams. Preferably, the plurality of the (first) deflection mirrors is formed by dichroic filters with an edge of the transmission and/or reflection within the respective spectral range of the respectively associated laser beam.

Preferably, a central control device is configured to control the electronic control devices, the beam imaging means, the beam superposition device and/or the imaging optics. In particular, a central control device is configured to control the position of the common focus by means of the control of the electronic control devices, the beam imaging means, the beam superposition device and/or the imaging optics. Preferably, the central control device is configured to control the electronic control devices, the beam imaging means, the beam superposition device and/or the imaging optics in a time-variable manner. In particular, a central control device is configured to control the geometry and/or the energy distribution of the common focus by means of the control of the electronic control devices, the beam imaging means, the beam superposition device and/or the imaging optics.

Preferably, a detection device for detecting a signal which corresponds to the laser material machining in the range of the (common) focus of the imaging optics is provided. Preferably, the detection device is formed by an optoelectronic sensor or by a video camera. Preferably, the central control device is designed to control the electronic control devices, the beam imaging means, the beam superposition device and/or the imaging optics according to the detected signal.

Preferably, predefined parameters for controlling the electronic control devices, the beam imaging means, the beam superposition device and/or the imaging optics are stored in the central control device (or in one of the stores associated with it). These parameters are preferably determined in advance based on test series in the form of a look-up table. Alternatively, these parameters are determined in advance based on simulations or calculations. Here, it is preferred that the parameters are determined and stored according to the dimensions and the material of the work piece to be used. It is further preferred that the parameters are determined and stored according to the prevailing process conditions.

According to another aspect of the present invention, a method for laser material machining is disclosed, in which: at least two laser beam sources emit laser beams of different wavelengths, the beam paths of the laser beams are appropriately adjusted by means of respectively associated beam imaging means, the laser beams are overlaid on each other (preferably, in a collinear manner) by means of a beam superposition device, and the overlaid laser beams are imaged onto a work piece by means of an imaging optics so that respective focal points are associated with the laser beams in the focus of the imaging optics on the work piece, wherein the beam imaging means image the laser beams onto the respective focal points in a predetermined arrangement which are varied by means of the laser imaging means, and wherein the powers of the respective laser beams are varied in a different manner by means of electronic control devices so that the intensities of the respective focal points vary in a predetermined manner in the focus of the imaging optics.

Preferably, the powers of the laser beams are directly varied by modulating a respective laser diode current. Preferably, no further beam shaping elements are arranged between the work piece and the imaging optics. Preferably, the work piece is fixed in a stationary manner during laser material machining. Alternatively, it is preferred that, during laser material machining, the work piece is movably formed along a plane which is arranged substantially vertically to the rotation axis of the imaging optics, and/or the device for laser material machining along a plane which is arranged substantially vertical to the rotation axis of the imaging optics the work piece is movably formed during laser material machining. Preferably, the (minimum) distance between the work piece and the imaging optics is less than 10 m, more preferably less than 2 m, even more preferably less than 1 m, still more preferably less than 50 cm and still more preferably less than 20 cm.

LIST OF FIGURES

Figure 2B:
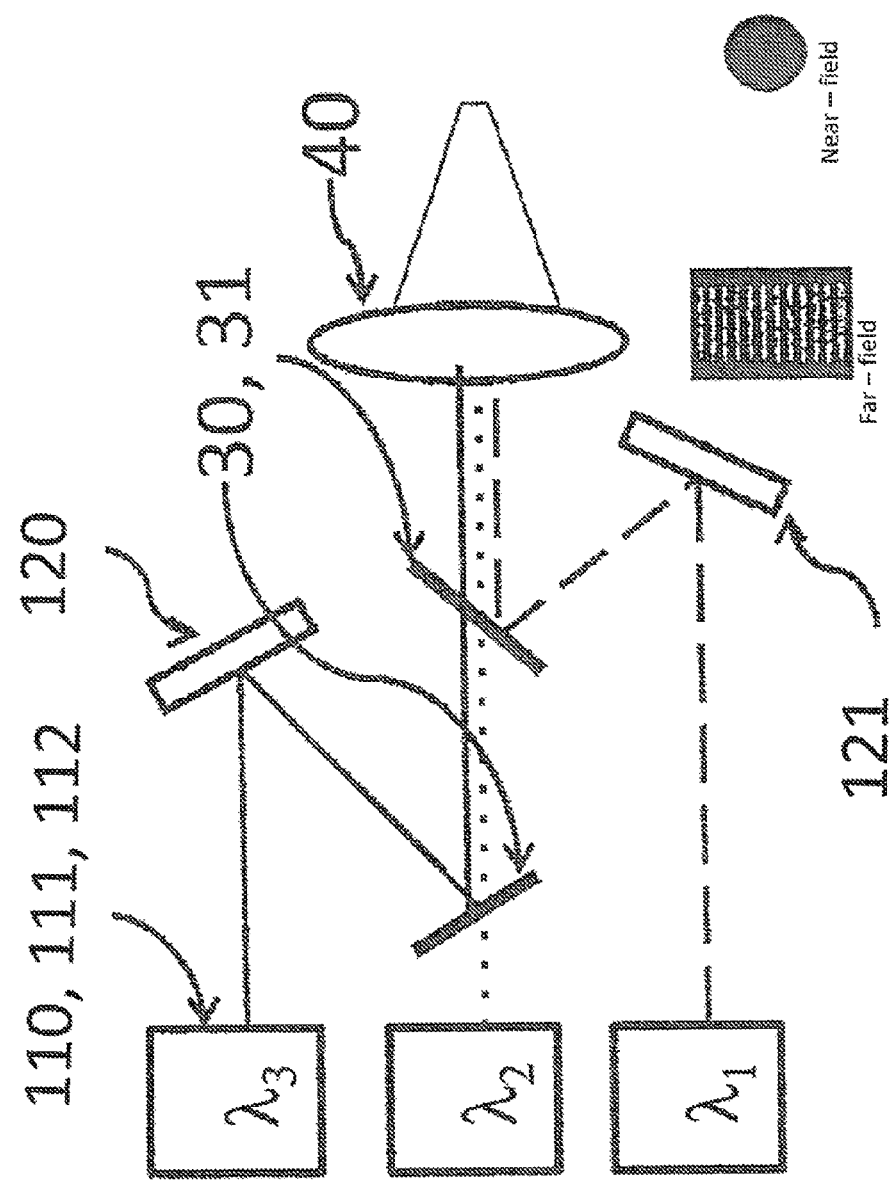
Figure 3B:
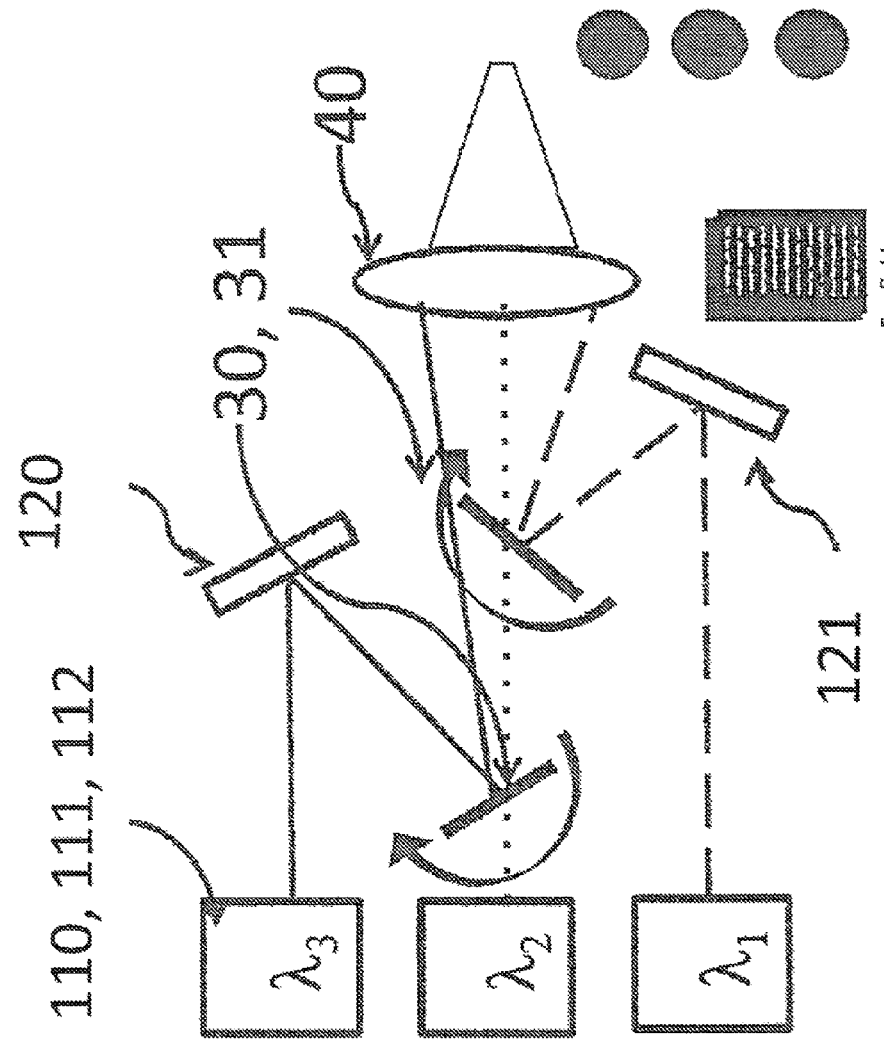
Figure 8:
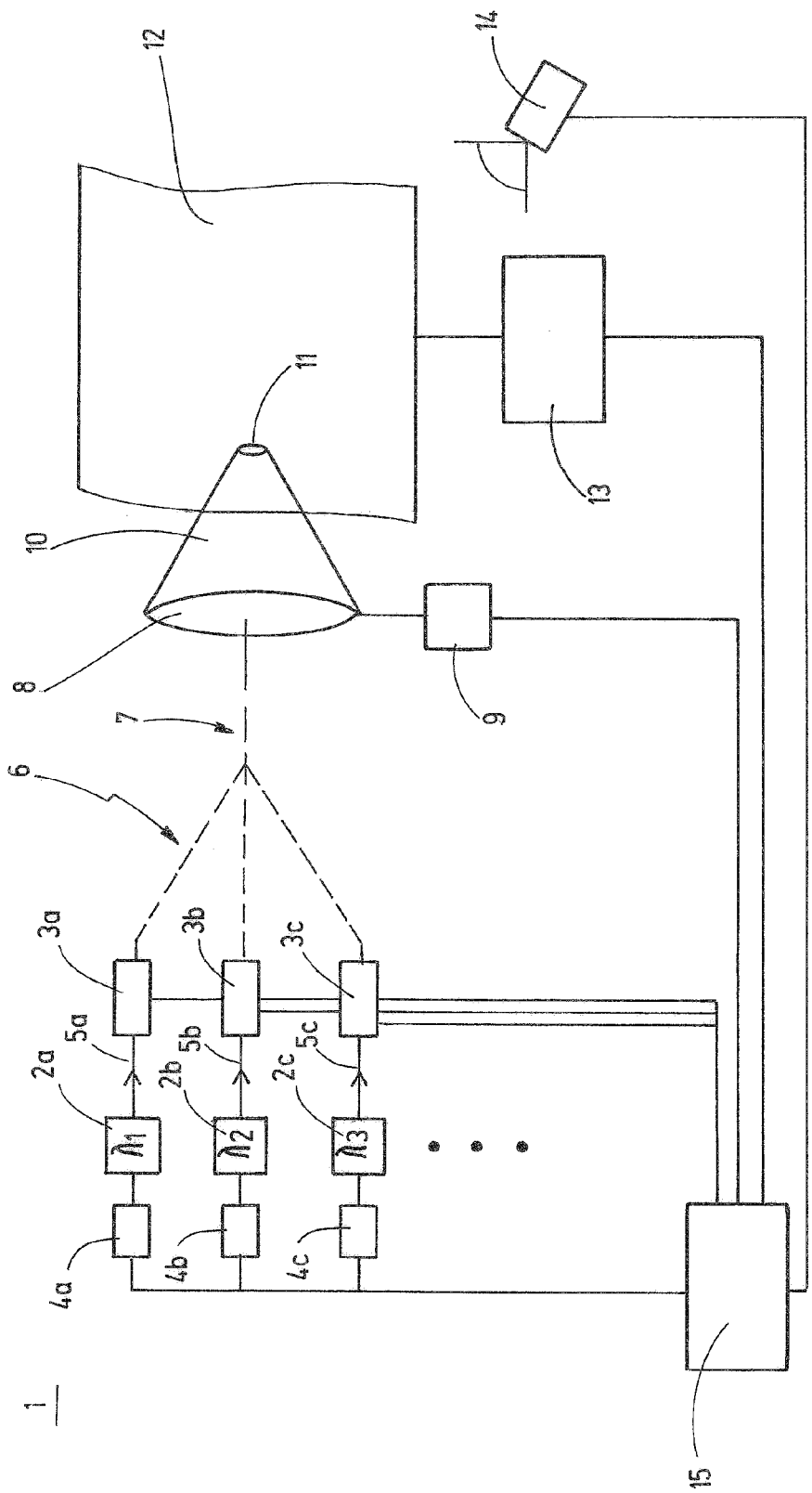

Hereinafter, the invention will be described in an exemplary manner with reference to the accompanying drawings, from which will follow further features, advantages and problems to be resolved. The figures show:

FIG. 1 a summary of conventional methods for varying the distances and intensities of a focus or of several foci;

FIG. 2a-2b the distribution of the intensity of several laser beams in the position space and spectral space as well as a device for laser material machining by means of such an intensity distribution according to a first embodiment of the present invention;

FIG. 3a-3b the distribution of the intensity of several laser beams in the position space and spectral space as well as a device for laser material machining by means of such an intensity distribution according to a second embodiment of the present invention;

FIG. 4 realizable intensity distributions of several laser beams in the range of the focus of an imaging optics on a work piece in a device and a method for laser material machining according to the present invention;

FIG. 5 possibilities of a modulation of the laser beams in a device and a method for laser material machining according to the present invention;

FIG. 6a the geometry in a conventional method for laser drilling as an example for laser material machining in the sense of the present invention;

FIGS. 6b and 6c the geometry at different instants of time (penetration depth of the laser beams into the work piece) in laser drilling, respectively, as an example for laser material machining according to the present invention;

FIG. 7a-7c further possibilities of a modulation of the laser beams in a device and a method for laser material machining according to the present invention; and FIG. 8 a schematic view of a device for laser material machining according to the present invention.

In the figures, like reference symbols refer to like or substantially identically acting elements or groups of elements.

DETAILED DESCRIPTION OF PREFERRED EMBODIMENTS

The invention is based on the coupling of the mutually independent dimensions of wavelength and position (FIG. 2a). A laser system having several separately drivable lasers of different wavelengths serves as a laser beam source. Conventional wavelength coupling of the individual lasers (110, 111, 112) results in a single laser beam in the position, but with a wide spectrum (FIG. 2b). Here, the beams having the wavelengths λ1 and λ3 are directed onto wavelength-selective elements 30, 31 via fixed deflection mirrors 120, 121 in such a way that all of the three laser beams are collinear afterwards. The wavelength-selective elements transmit a wavelength and reflect another wavelength. They can be realized as dichroic mirrors or volume Bragg gratings (VBG), wherein the specific arrangement must be adapted correspondingly. The combined laser beam is subsequently focused by a lens 40. The corresponding far-field at the position of the lens and the near-field in the focus are exemplified in FIG. 2b.

As a result of tilting the wavelength-selective elements 30, 31, the three beams of the respective lasers 110, 111, 112 no longer run parallel to each other. But, due to the small distance to the beam sources and the small deflection angles, the individual far-fields are only slightly shifted with respect to each other in the far-field at the position of the focusing lens 40. By way of example, the individual lasers are realized as diode lasers with a residual divergence of about 0.5 mrad and a beam cross section of 14×14 mm². Thus, a focus of about 200 μm is generated with a focus lens having a focal length of 100 mm. In this arrangement, an angle of 1 mrad between two laser beams results in two individual foci, the centers of which are spaced from one another by 200 μm. If the tilting of the wavelength-selective elements 30, 31 is executed about the respectively same axis and by the same amount, a line focus is obtained in the focus distance of the lens 40 (see FIG. 3a).

The tilting of the wavelength-selective elements 30, 31 can be performed about any axis. Further, the number of the individual lasers can be considerably more than three, for example, up to twenty and more. This allows to adjust a large plurality of focus geometries at the work piece (see FIG. 4). A line is produced by tilting all of the wavelength-selective elements about the same axis, but by different amounts. A round focus with an annular intensity distribution is obtained by tilting a number N of the wavelength-selective elements of N lasers on two axes. The beams of the N lasers diverge circularly and are correspondingly imaged into the focus. A number M of lasers extend collinear and are all imaged into one focus. The power ratio of ring to core is equal to the ratio N/M of the respective number of lasers.

Similarly, two foci of different sizes can be generated at the work piece. In this case, N lasers are collinearly imaged onto a focus while M lasers are imaged with different pointing onto another focus which may also have a different diameter. In this case, the power in the foci is again determined by the number N and M of the lasers and by their power. Similarly, a plurality of further focus geometries can be generated, as for example an arrow.

If the radiation is coupled into a fiber, only geometries with a radial symmetry can be generated in the previously described manner.

The previously described arrangement and method allow the generation of any focus geometries at the work piece. Here, the wavelength-selective elements are slightly tilted against each other in a well-defined manner. Thus, in conjunction with a power regulation of the individual lasers of different wavelengths, the photon density may be selected with no restrictions in space and time (FIG. 5). This leads to maximum flexibility and allows to optimize individual processes and to carry out a plurality of processes with only one focusing optics.

FIG. 8 shows a schematic view of a device for laser material machining according to the present invention, for example for laser cutting, laser hardening, laser build-up welding, laser ablation or laser drilling. The laser device 1 comprises a plurality of laser beam sources 2a-2c the number of which is greater than 2 and is preferably in the range from three to ten or twenty. The laser beam sources 2a-2c emit respective laser beams 5a-5c with a predetermined wavelength λ1-λ3 which differ from each other. This can be easily realized by means of an appropriate operation of the laser beam sources 2a-2c. The wavelengths λ1-λ3 can be stabilized and particularly be electronically controlled or regulated. Preferably, the laser beam sources 2a-2c are laser diodes or laser diode stacks, for example, with powers of a few kilowatts. The laser beams 5a-5c may already be collimated before they reach the area of influence of the downstream and respectively associated imaging optics 3a-3c. A collimation optics 6, optionally a light guide 7, for example, an optical fiber or an optical fiber bundle, and a focusing optics 8, for example, a conventional focusing objective, is associated with the imaging optics 3a-3c, wherein the focusing optics 8 can be freely adjusted in the spatial directions by means of an actuator 9, for example, an electronically drivable xyz-adjusting device. Thus, a desired position or a desired curve of the focus 11 can be realized on the work piece 12 by means of the focusing optics 11. The work piece can be freely moved relative to the focusing optics 8 by an actuator, for example, an electronically drivable xyz-adjusting device, so that the focus 11 can be appropriately focused and/or moved onto the work piece 12.

A detection device 14, for example, an optoelectronic sensor or a video camera is directed onto the range of the focus 11 on the work piece and detects an electronic signal that is transmitted to a central control device 15, for example, a CPU which can appropriately control or regulate all components of the illustrated laser device 1 according to the requirements, as described below.

The laser beam sources 2a-2c are associated with electronic control devices 4a-4c which appropriately control relevant operating parameters of the laser beam sources 2a-2c, particularly a laser diode current and components which serve a wavelength selection, a laser extraction, a laser beam modulation, and the like.

The imaging optics 3a-3c execute individually or in cooperation with the downstream collimation optics 6 a predetermined arrangement of the focal points corresponding to the respective laser beams 5a-5c in the focus 11 of the focusing optics 8 on the work piece 12.

The electronic control devices 4a-4c can especially control or regulate the relevant operating parameters of the laser beam sources 2a-2c at high frequency and with high resolution, particularly with frequencies significantly above the operating frequencies of usual mechanical components for varying the intensity or imaging of the laser beams 5a-5c. While the latter frequencies are at most in the range of one or a few kHz, the operating parameters of the laser beam sources 2a-2c can be varied according to the invention with frequencies of several ten kHz to one or several MHz by means of the electronic control devices 4a-4c, allowing, according to the invention, a further degree of freedom for adjusting the parameters in the laser material machining. For example, the diode currents of laser diodes or laser diode stacks can be varied in the MHz range.

The electronic control devices 4a-4c preferably act immediately upon the laser beam sources 2a-2c, for example, by varying the diode currents. In principle, it is also conceivable, according to the invention, that further optical components downstream of the laser beam sources 2a-2c appropriately modulate the powers of the laser beams 5a-5c, for example, in the form of electro-optic modulators which can be readily operated in the MHz range and can be a part of the imaging optics 3a-3c.

The wavelengths $\lambda 1$-$\lambda 3$ of the laser beams 5a-5c are different in the sense of the present invention and may differ from each other by several nanometers or more. It is preferred that the frequency or wavelengths distances of the laser beams 5a-5c are equally spaced from each other or have regular or regularly varying ratios with respect to each other in the frequency or wavelength space, as exemplified in the FIGS. 7a to 7c.

The imaging optics 3a-3c can be formed, in particular, by a plurality of deflection mirrors, particularly in the folded configuration illustrated in FIG. 2b or 3b. As shown in FIG. 8, all laser beams 5a-5c can thus be imaged in a collinear manner onto a common collimated beam bundle which is imaged onto the imaging optics 8 with a slight divergence. The laser beams 5a-5c may substantially completely overlap, so that they are then substantially imaged onto a common focus 11 (except for chromatic imaging aberrations), as shown in the upper image part of FIG. 2a, or they can be imaged onto several focal points spaced apart from each other or only partially overlapping in the focus 11 of the focusing optics 8 (as shown, for example, in the upper image part of FIG. 3a). Thus, the focal points associated with the respective laser beams 5a-5c can be imaged in nearly any geometric arrangement in the focus 11 of the focusing optics 8 by means of the common focusing optics 8 (as exemplified in FIG. 4).

According to the invention, the powers of the individual laser beams 5a-5c can be electronically varied with a high frequency, so that the intensities of the focal points associated with the respective laser beams 5a-5c can be varied in the focus of the focusing optics 8 with a high frequency and nearly at will which, according to the invention, results in new degrees of freedom in the laser material machining of work pieces, as will be described below.

Although FIG. 8 illustrates that a common focusing optics 8 images all laser beams 5a-5c onto the focus on the work piece 12, it is principally conceivable that the focusing optics 8 comprises several focusing optical components or imaging systems which are associated with one or several laser beams 5a-5c, respectively. In such an embodiment, a precise adjustment of the several focusing optical components or imaging systems has to be ensured, so that all laser beams 5a-5c have to be imaged onto a common focus or focal spot on the work piece 12.

The mirrors of the aforementioned imaging optics 3a-3c can be formed as dichroic filters which have edges of increasing transmission or reflection in the wavelength range of the respectively associated laser source 5a-5c. By means of a folded arrangement of such dichroic filters, such as exemplified in the FIGS. 2b and 3b, the wavelength of the lasers 2a-2c (see FIG. 2b and FIG. 3b: reference symbols 10-12) can be stabilized and, particularly, a wavelength selection and/or stabilization of the individual lasers 2a-2c can be realized, too. In particular, a wavelength selection and wavelength stabilization of the individual lasers 2a-2c can be simultaneously realized by rotating or tilting the dichroic filters acting as deflection mirrors (see FIG. 2b and FIG. 3b: reference symbols 20, 21, 20, 31).

All deflection mirrors of the folded mirror arrangements according to the FIG. 2b or 3b can be tilted or rotated about a common axis, so that the focal points of the respective laser beams 5a-5c will be arranged in the range of the focus of the focusing optics 8 on the work piece along a line, such as exemplified in the top line of FIG. 4. Nearly any geometric distributions of the focal points of the respective laser beams 5a-5c can be realized on the work piece 12 in the range of the focus of the focusing optics 8 by tilting or rotating such deflection mirrors in different spatial directions, as is exemplified in the other lines of FIG. 4.

Examples of the modulation of the respective laser beams 5a-5c in the sense of the present invention are summarized in the FIGS. 7a-7c. Referring to FIG. 7a, several laser beams in the wavelength range are preferably arranged with regular distances from each other at wavelengths $\lambda 1$-$\lambda 6$, particularly with an associated Gaussian spectral distribution, respectively. The widths of the Gaussian intensity distributions illustrated in the upper image part of FIG. 7a may particularly be the same. As illustrated in the lower image part of FIG. 7a, the intensities of the individual laser beams can be appropriately varied with the wavelengths $\lambda 1$-$\lambda 6$, which can particularly be realized by means of an appropriate amplitude-width modulation or pulse-width modulation (PWM) of the respective diode currents. Transferred to the position space in the focus on the work piece, nearly any spatial distribution of the intensity can be realized on the work piece in the focus of the focusing optics 8 (see FIG. 8) by adjusting the intensities of the respective focal points of the laser beams.

Referring to FIG. 7b, the wavelengths of the laser beams are varied in addition to the intensity (or alternatively thereto), which, solely due to chromatic imaging aberrations of the focusing optics 8 (see FIG. 8), may also lead to a local change of the intensities of the respective focal points of the laser beams in the focus on the work piece.

Referring to FIG. 7c, the spectral widths of the respective laser beams are varied at the wavelengths $\lambda 1$-$\lambda 6$ in addition to the intensity (or alternatively thereto), which may also vary the process parameters of the laser material machining in the focus on the work piece. Such a change can be realized, for example, by means of electronically controllable Q-switches, particularly intracavity Q-switches.

The effects according to the present invention will hereinafter be explained in detail using the example of laser drilling (representative for any other laser material machining processes according to the present invention).

FIG. 6a summarizes the conditions in conventional laser drilling by means of a focused laser beam. The laser beam 10 forms a Gaussian beam waist in the range of the focus of the focusing optics, so that the opening width D1 of the drill hole is greater at the surface of the work piece 12 than deeper in the material of the work piece 12 (indicated, as an example, by the opening width D2). This limits the achievable steepness of edges of such laser drill holes or, in other material machining processes, corresponding geometric quantities and characteristics of the work piece to be machined. Though, for example, the distance or the focusing of the used focusing optics could be varied in the course of the material machining, such as exemplarily disclosed in DE 199 61 918 A, but such a variation regularly can only be performed relatively slowly due to the mechanical adjustments necessary thereto.

In contrast, parameters of the laser machining processes which are decisive according to the invention may be purely (or additionally) electronically varied, so that the corresponding variations may be executed significantly faster (by up to several orders of magnitude). This is exemplified for laser drilling (representative for any other laser material machining processes according to the present invention) in FIGS. 6b and 6c which illustrate the profile of the drill hole 20 at two different instants of time of the laser drilling. At the beginning of the laser drilling, the incident focused laser beam bundle 10—predetermined by the imaging characteristics and the operation parameters of the laser device 1 according to FIG. 8—is focused onto the surface of the work piece 12 in the exemplified manner, resulting in an opening width D1 of the drill hole 20 at the beginning of the laser drilling.

As illustrated in FIG. 6, at a later instant of time, the imaging and focusing characteristics of the laser beam bundle 10 are different due to the inventive electronic control of components of the laser device 1 according to FIG. 8, so that a substantially identical opening width D1 of the drill hole 20 can be also realized at the later instant of time, due to the respectively prevailing imaging and focusing conditions of the laser beam bundle 10. Thus, according to the invention, the drill hole 20 can be formed with high edge steepness and precision.

According to the invention, the conditions of imaging and focusing of the individual laser beams 5a-5c (see FIG. 8) of the laser beam bundle 10 may also be varied with a high frequency. According to the invention, this allows a higher precision in material machining at high speeds. The aforementioned modulation techniques (power or intensity modulation, frequency modulation, quality modulation) may be spatially and temporally combined at will. Of course, the aforementioned modulation techniques may be combined with conventionally slower mechanical or otherwise realized modulation techniques. For example, the deflection mirrors of the imaging optics can be scanned or adjusted periodically or corresponding to a predetermined pattern in the way of scanner mirrors while the aforementioned power or intensity modulation, frequency modulation, quality modulation and the like is simultaneously performed electronically and with appropriate frequencies.

These modulation techniques can also be controlled or regulated by means of the central control device 15 illustrated in FIG. 8. For this purpose, the focus 11 is monitored and detected by the above described detection device 14 and is appropriately controlled or regulated with respect to the modulation based on the detected signal. For this purpose, predetermined parameters for controlling the electronic control devices 41-4c and/or further components of the laser device 1, for example, the beam imaging means 3a-3c and/or beam supervision device 6 and/or the imaging optics 8, can be stored in the central control device 15 or in one of the stores associated thereto (not shown), respectively corresponding to a desired predetermined laser material machining. Of course, these parameters can also be stored specifically for the respectively used material of the work piece 12 or the further prevailing process conditions. For example, these parameters may be determined in advance based on test series in the form of a look-up table, but they may also be determined based on simulations or calculations.

As will become apparent to those skilled in the art in the study of the above description, the above features, according to the invention, may also be combined with each other in any other suitable manner than described above. Such modifications shall be comprised in the scope of the appended claims insofar as they make use of the general solution concept of the invention as described above.

LIST OF REFERENCE NUMERALS 1 device for laser material machining
2a-2c laser beam sources
3a-3c imaging optics
4a-4c laser control device
5a-5c laser beam
6 collimation optics
7 imaging optics/light guide
8 focusing optics
9 actuator
10 focused laser beam
11 focus
12 work piece
13 actuator
14 camera/sensor
15 central control device/CPU
20 drill hole
30 wavelength-selective element
31 wavelength-selective element
40 lens
110 laser
111 laser
112 laser
120 deflection mirror
121 deflection mirror

What is claimed is:
1. A device for laser material machining, comprising:
at least two laser beam sources which emit laser beams of different wavelengths,
beam imaging means which are associated with the laser beam sources, respectively, and configured to appropriately adjust the beam paths of the respective laser beams, a beam superposition device configured to overlay the laser beams on each other, an imaging optics configured to image the overlaid laser beams onto a work piece in such a way that respective focal points are associated with the laser beams in the focus of the imaging optics on the work piece, wherein the beam imaging means image the laser beams onto the respective focal points in a predetermined arrangement which can be varied by means of the beam imaging means, and electronic control devices designed to vary the powers of the respective laser beams in a different manner, so that the intensities of the respective focal points are varied in a predetermined manner in the focus of the imaging optics.

2. The device of claim 1, wherein the beam superposition device comprises a plurality of deflection mirrors wherein at least one of the deflection mirrors is arranged and configured in such a way that it is passed by at least one of the laser beams and reflects at least one of the laser beams.

3. The device of claim 1, wherein the beam imaging means adjust the beam paths of the respectively associated laser beams in such a way that they are substantially collinear, wherein the laser beams are collimated, respectively.

4. The device of claim 1, wherein the beam imaging means comprise tiltable and/or rotatable deflection mirrors in order to appropriately adjust the predetermined arrangement of the respective focal points in the focus of the imaging optics.

5. The device of claim 1, wherein the electronic control devices vary the powers of the respective laser beams by controlling the respectively associated laser beam sources.

6. The device of claim 1, wherein the electronic control devices vary the transmission of one respective electronically controllable attenuator that is arranged downstream of the associated laser beam sources, respectively, in order to vary the powers of the respective laser beams.

7. The device of claim 1, wherein the beam superposition device can be adjusted to adjust the beam superposition of the laser beams, and thus the imaging of the respective focal points is varied in the focus of the imaging optics.

8. The device of claim 1, wherein a plurality of deflection mirrors is formed by dichroic filters with an edge of the transmission or reflection within the respective spectral range of the respectively associated laser beam.

9. The device of claim 1, further comprising a central control device for controlling the electronic control devices, the beam imaging means, the beam superposition device and/or the imaging optics.

10. The device of claim 1, wherein the central control device is configured to control the electronic control devices, the beam imaging means, the beam superposition device and/or the imaging optics in a time-variable manner.

11. The device of claim 1, further comprising a detection device for detecting a signal which corresponds to the laser material machining in the range of the focus of the imaging optics.

12. The device of claim 11, wherein the detection device is formed by an optoelectronic sensor or by a video camera.

13. The device of claim 12, wherein the central control device is designed to control the electronic control devices, the beam imaging means, the beam superposition device and/or the imaging optics according to the detected signal.

14. The device of claims 9, wherein predetermined parameters for controlling the electronic control devices, the beam imaging means, the beam supervision device and/or the imaging optics are stored in the central control device or in one of the stores associated thereto.

15. The device according to claim 1, wherein a plurality of polarization-selective elements is provided which are passed by at least one of the laser beams.

16. A method for laser material machining for a device comprising:

at least two laser beam sources which emit laser beams of different wavelengths, beam imaging means which are associated with the laser beam sources, respectively, and configured to appropriately adjust the beam paths of the respective laser beams, a beam superposition device configured to overlay the laser beams on each other, an imaging optics configured to image the overlaid laser beams onto a work piece in such a way that respective focal points are associated with the laser beams in the focus of the imaging optics on the work piece, wherein the beam imaging means image the laser beams onto the respective focal points in a predetermined arrangement which can be varied by means of the beam imaging means, and electronic control devices designed to vary the powers of the respective laser beams in a different manner, so that the intensities of the respective focal points are varied in a predetermined manner in the focus of the imaging optics, the method comprising the following steps:

at least two laser beam sources emit laser beams of different wavelengths, the beam paths of the laser beams are appropriately adjusted by means of respectively associated beam imaging means, the laser beams are overlaid on each other by means of a beam superposition device, and the overlaid laser beams are imaged onto a work piece by means of an imaging optics, so that respective focal points are associated with the laser beams in the focus of the imaging optics on the work piece, wherein the beam imaging means image the laser beams onto the respective focal points in a predetermined arrangement which are varied by means of the beam imaging means, and wherein the powers of the respective laser beams are varied in a different manner by means of electronic control devices, so that the intensities of the respective focal points are varied in a predetermined manner in the focus of the imaging optics.

17. The method of claim 16, wherein the powers of the laser beams are directly varied by modulating a respective laser diode current.

* * * * *